Sept. 25, 1928.
H. BARTENBACH ET AL
1,685,145
HOOK
Filed Sept. 16, 1926
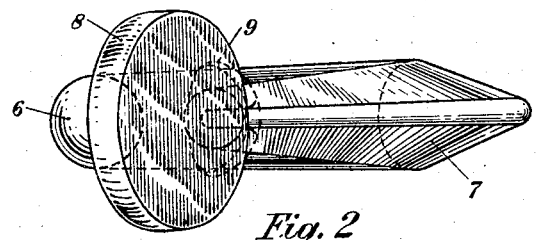
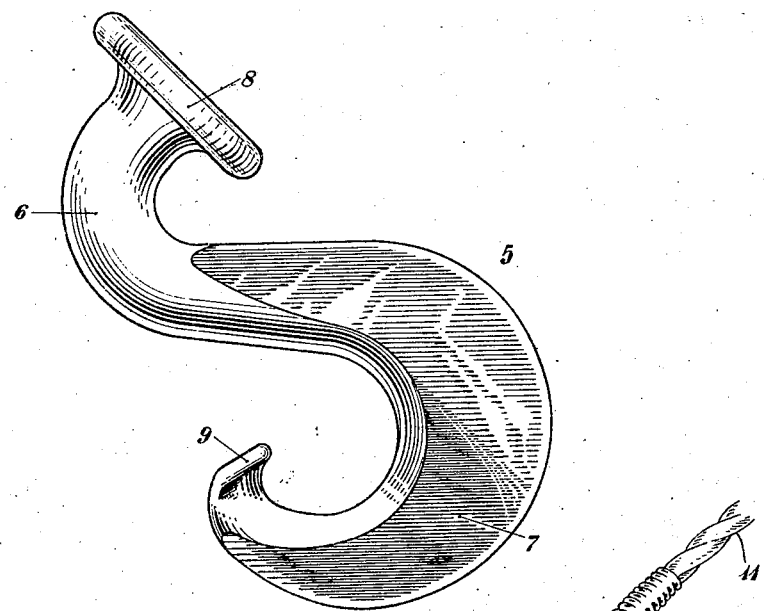
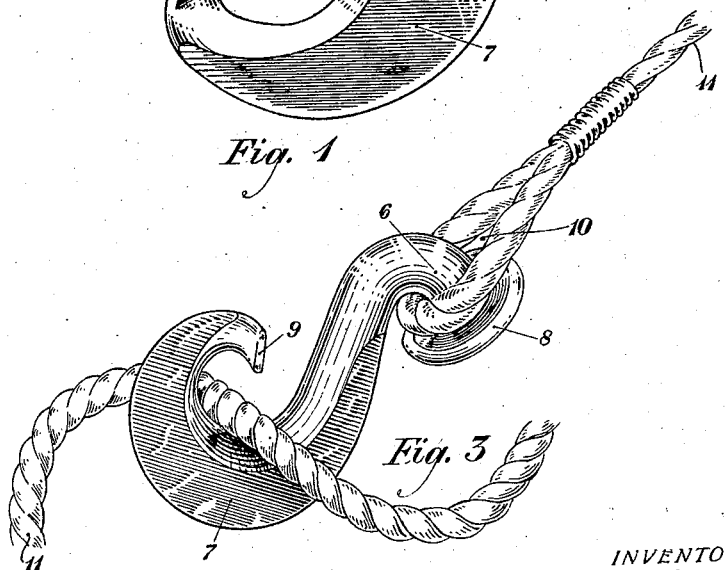
INVENTORS
H. Bartenbach and A. E. Freeman
BY
ATTORNEY Patented Sept. 25, 1928.

1,685,145

UNITED STATES PATENT OFFICE.

HERMAN BARTENBACH, OF PITTSBURGH, PENNSYLVANIA, AND ALBERT E. FREEMAN, OF ANDOVER, NEW JERSEY, ASSIGNORS TO AMERICAN TELEPHONE AND TELEGRAPH COMPANY, A CORPORATION OF NEW YORK.

HOOK.

Application filed September 16, 1926. Serial No. 135,928.

This invention relates to improvements in hooks, which are more particularly adapted for use with ropes such as winch ropes.

An object of the invention consists in the provision of a hook for use with ropes which may be readily attached thereto and detached therefrom.

Another object of the invention consists in the provision of a hook which will prevent the bight of the rope slipping off the hook while it is in use.

These and further objects will be apparent from the following description, when considered in connection with the accompanying drawing, in which one embodiment of the invention is illustrated.

Referring to the drawing, Figure 1 represents a side elevation of the hook; Fig. 2 a top plan view thereof, and Fig. 3 a perspective view showing a rope attached to the hook.

In the drawing, in which similar characters of reference designate like parts throughout the several views, 5 represents the main body of the hook. The hook may be composed of iron or like metal and is of substantially S-shaped form. This form comprises two half loops 6 and 7 oppositely positioned with respect to each other. The curved portion or loop end 6 terminates in a substantially circular shaped button 8, and the curved portion 7 or hook section terminates at its point or hook end in a similarly shaped button 9. The button 9 is of smaller dimension than the button 8, and these buttons are so disposed on the ends of the hook that they lie in planes substantially at right angles to each other. The button 9 also lies substantially at right angles to an axis passing from the shank to the mid-point of the hook section.

The hook is attached to the free end of a rope by thrusting the small button 9 through the eye 10 of the rope 11. The remaining portion of the hook may be then pushed through the eye of the rope until said eye portion almost reaches the large button portion 8 of the hook. The hook may be then turned 180° and the movement of said eye portion continued until it rests against the button 8. When so positioned, the button 8 serves to retain the hook in attached position in the eye of the rope. The button 9 at the pointed end of the hook serves to prevent the slippage of the bight of the rope from the hook when in operation in an obvious manner. The attachment of the hook and the rope with the bight portion of the rope in position on the hook section is best shown in Fig. 3.

The use of the detachable hook is convenient in passing the winch rope end under a pole lying on the ground, and is also convenient in connection with the removal of the hook in order to permit using the rope for pulling cable through rings.

The hook may be readily detached from the free rope end when desired, but it cannot be accidently detached when a load is being carried by the rope and its associated hook. When the winch rope end to which the hook is attached is looped around a pole with the smaller end of the hook engaging the bight of the rope and with the rope under tension ready to lift the pole, there is no tendency for the hook to turn on the pole. The small end of the hook enlarged by the provision of the button as described, functions in such manner that if the bight of the rope should tend to slide toward the end of the hook, the enlarged end thereof would prevent it from slipping off the hook.

What is claimed is:

1. A hook having two oppositely curved sections comprising a substantially S-shaped body portion, a substantially circular button at one end thereof, and a second substantially circular shaped button at the other end thereof, said buttons lying in a plane substantially at right angles to each other on opposite sides of an axis passing through the hook to the midpoint of each curved section.

2. A hook having two oppositely curved sections comprising an S-shaped body portion adapted to have the eye of the rope attached to one end thereof, a substantially circular button cooperating with the body portion to retain the rope in position, and a second substantially circular shaped button on the opposite end of the body portion and cooperating therewith to receive and retain the bight of the rope, said buttons lying in a plane substantially at right angles to each other on opposite sides of an axis passing through the hook to the midpoint of each curved section.

3. A hook having two oppositely curved sections comprising a substantially S-shaped shank portion, said shank portion being adapted to have an eye of a rope attached to an end of one curved section, a substantially circular button on one end of the shank portion co-operating with said curved section to retain the rope in position, and a second substantially circular shaped button on the opposite end of the shank portion and co-operating with the second curved section to receive and retain the bight of the rope, said buttons lying in a plane substantially at right angles to each other, one of said buttons lying in a plane substantially at right angles and at one side of an axis passing through the shank to the midpoint of each curved section, and the other button lying in a plane substantially parallel and on the opposite side of said axis.

In testimony whereof, I have signed my name to this specification this 8th day of September, 1926.

HERMAN BARTENBACH.

In testimony whereof, I have signed my name to this specification this 25th day of August, 1926.

ALBERT E. FREEMAN.